(12) United States Patent
Yamamoto et al.

(10) Patent No.: US 10,787,076 B2
(45) Date of Patent: Sep. 29, 2020

(54) VEHICLE DISPLAY DEVICE

(71) Applicant: Yazaki Corporation, Tokyo (JP)

(72) Inventors: Kenzo Yamamoto, Shizuoka (JP);
Gosei Sato, Shizuoka (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 15/923,132

(22) Filed: Mar. 16, 2018

(65) Prior Publication Data

US 2018/0272867 A1     Sep. 27, 2018

(30) Foreign Application Priority Data

Mar. 24, 2017     (JP) .................................. 2017-058899

(51) Int. Cl.
*B60K 35/00* (2006.01)
*B60K 37/04* (2006.01)
*B60K 37/06* (2006.01)

(52) U.S. Cl.
CPC .............. *B60K 35/00* (2013.01); *B60K 37/04* (2013.01); *B60K 37/06* (2013.01); *B60K 2370/126* (2019.05); *B60K 2370/155* (2019.05); *B60K 2370/1537* (2019.05); *B60K 2370/188* (2019.05); *B60K 2370/20* (2019.05); *B60K 2370/29* (2019.05); *B60K 2370/31* (2019.05); *B60K 2370/33* (2019.05); *B60K 2370/695* (2019.05); *B60K 2370/774* (2019.05)

(58) Field of Classification Search
CPC ............ B60K 35/00; B60K 2350/1072; B60K 2350/2008; B60K 2350/203; B60K 2350/206; B60K 2350/2065; B60K 2350/402
See application file for complete search history.

(56) References Cited

U.S. PATENT DOCUMENTS

| 7,382,234 | B2 | 6/2008 | Yokota et al. |
| 10,121,285 | B2 | 11/2018 | Ito |
| 2002/0186228 | A1* | 12/2002 | Kobayashi ............. B60K 35/00 345/633 |
| 2005/0203684 | A1 | 9/2005 | Borgesson |

(Continued)

FOREIGN PATENT DOCUMENTS

| DE | 102 97 674 T5 | 7/2005 |
| DE | 10 2005 029 800 A1 | 1/2007 |

(Continued)

OTHER PUBLICATIONS

Communication dated Oct. 29, 2018 from the German Patent Office in counterpart Application No. 10 2018 203 955.0.

(Continued)

*Primary Examiner* — Mohamed Barakat
(74) *Attorney, Agent, or Firm* — Sughrue Mion, PLLC

(57) ABSTRACT

A vehicle display device includes a display unit having a pointer, a dial plate as a background of the pointer, and a frame surrounding the dial plate, at least one of the pointer, the dial plate, and the frame being a physical element, and a virtual image display device that displays a virtual image overlapping with the physical element, in which the virtual image display device changes at least one of a color and a design of the virtual image overlapping with the physical element.

13 Claims, 16 Drawing Sheets

(56) References Cited

U.S. PATENT DOCUMENTS

| | | | | |
|---|---|---|---|---|
| 2008/0123322 A1* | 5/2008 | Tane | ................ | B60K 35/00 |
| | | | | 362/23.01 |
| 2015/0379776 A1* | 12/2015 | Ito | ..................... | G01D 7/04 |
| | | | | 345/419 |
| 2016/0016472 A1* | 1/2016 | Konishi | ............ | B60K 35/00 |
| | | | | 345/633 |
| 2017/0174081 A1* | 6/2017 | Nojiri | .............. | B60K 35/00 |
| 2017/0253178 A1* | 9/2017 | Tane | ................ | B60K 35/00 |

FOREIGN PATENT DOCUMENTS

| | | |
|---|---|---|
| EP | 1 342 605 A1 | 9/2003 |
| JP | 2006-132950 A | 5/2006 |
| JP | 2009-192434 A | 8/2009 |
| JP | 2014153270 A | 8/2014 |
| JP | 2016022743 A | 2/2016 |
| JP | 2016055680 A | 4/2016 |
| JP | 2016118495 A | 6/2016 |

OTHER PUBLICATIONS

Notice of Reasons for Refusal dated Jun. 11, 2019 from the Japanese Patent Office in application No. 2017-058899.

\* cited by examiner

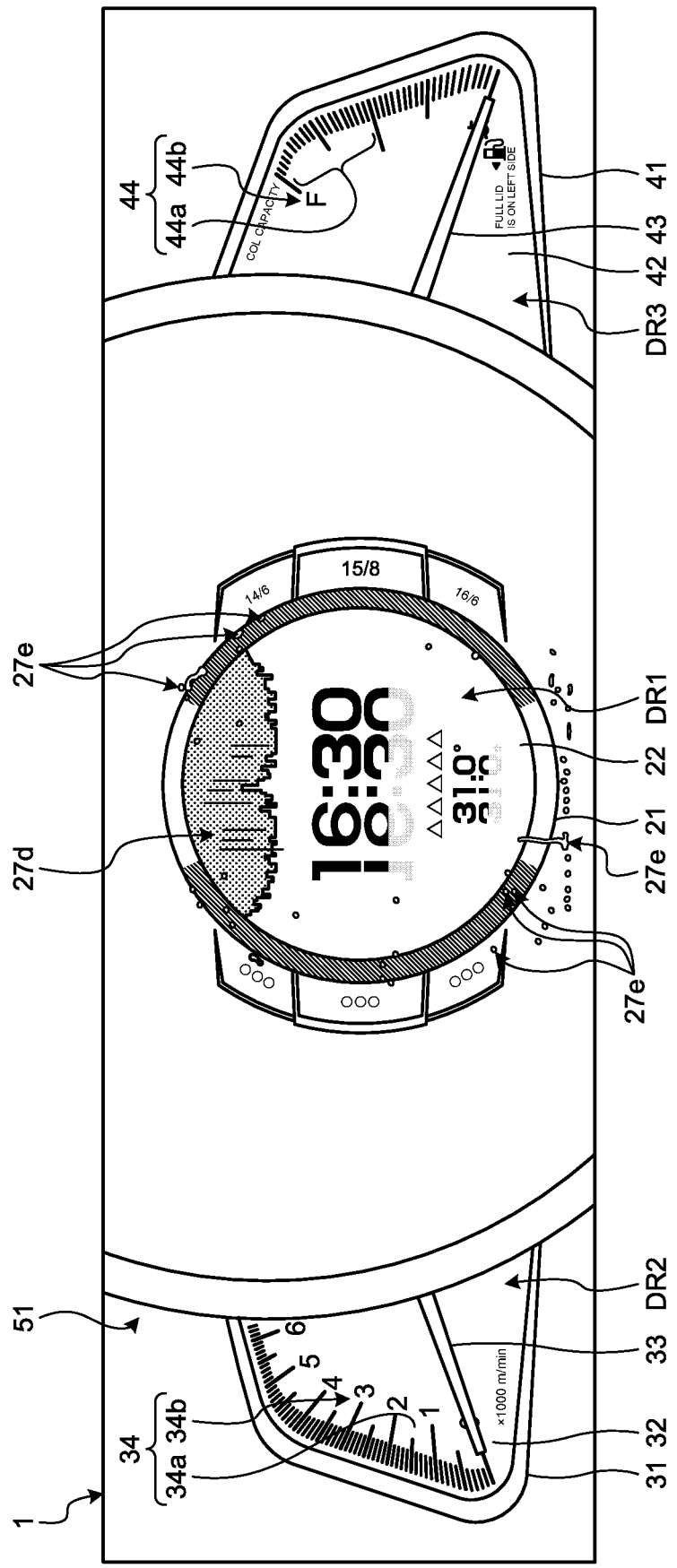

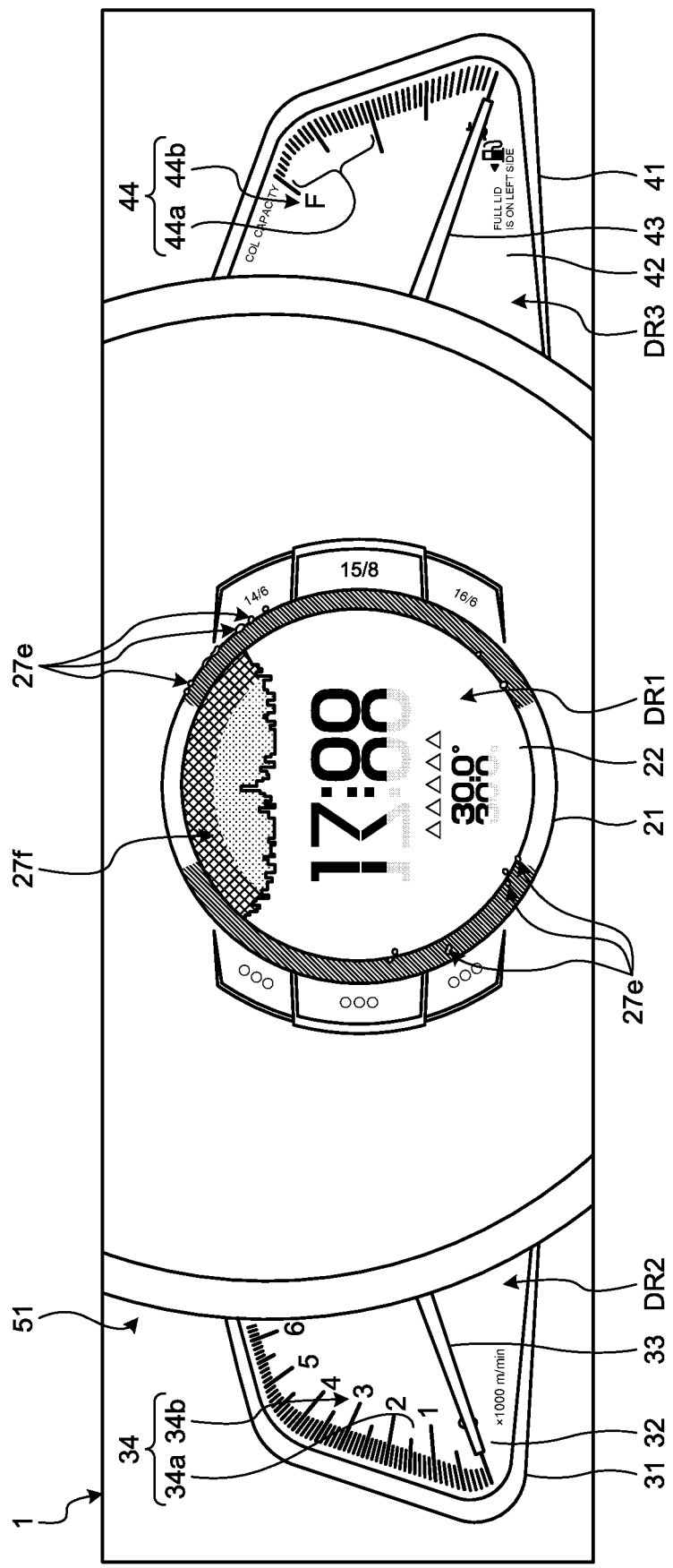

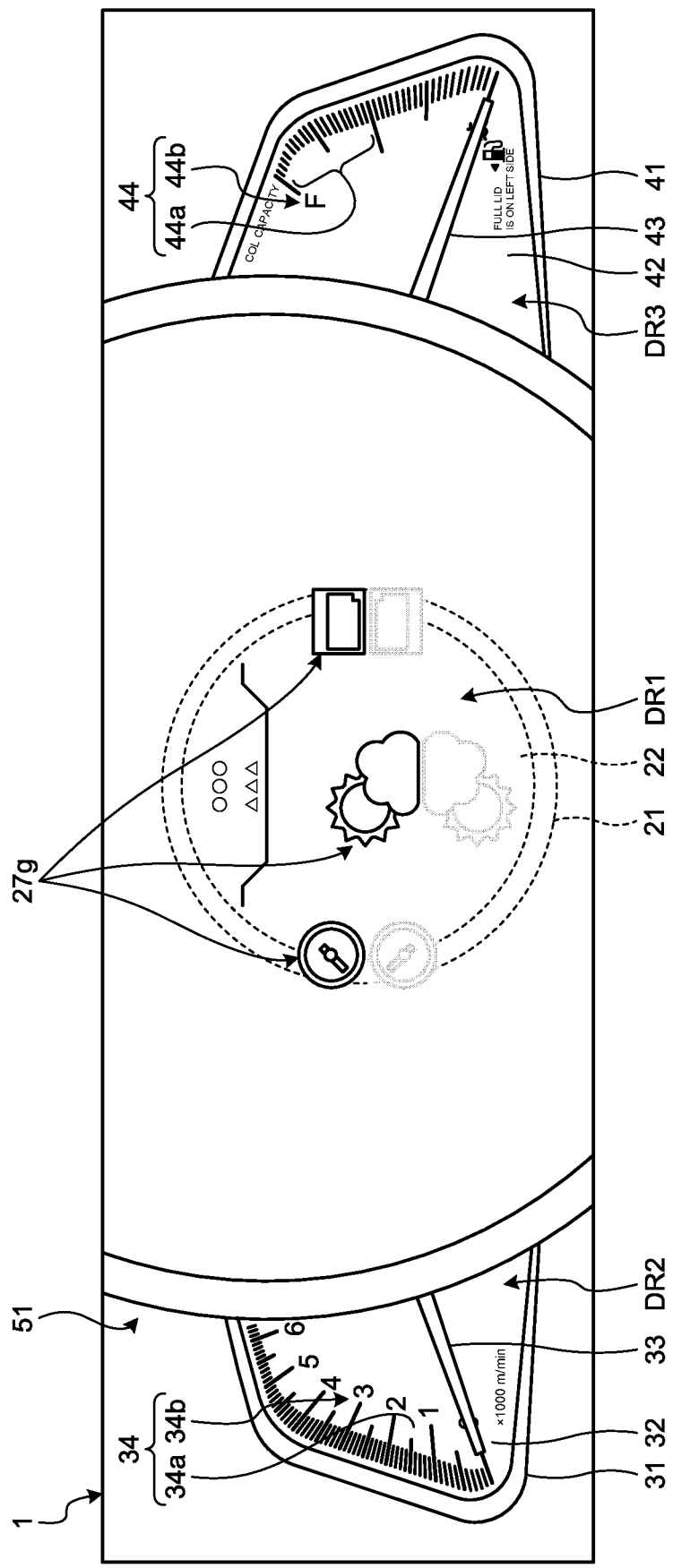

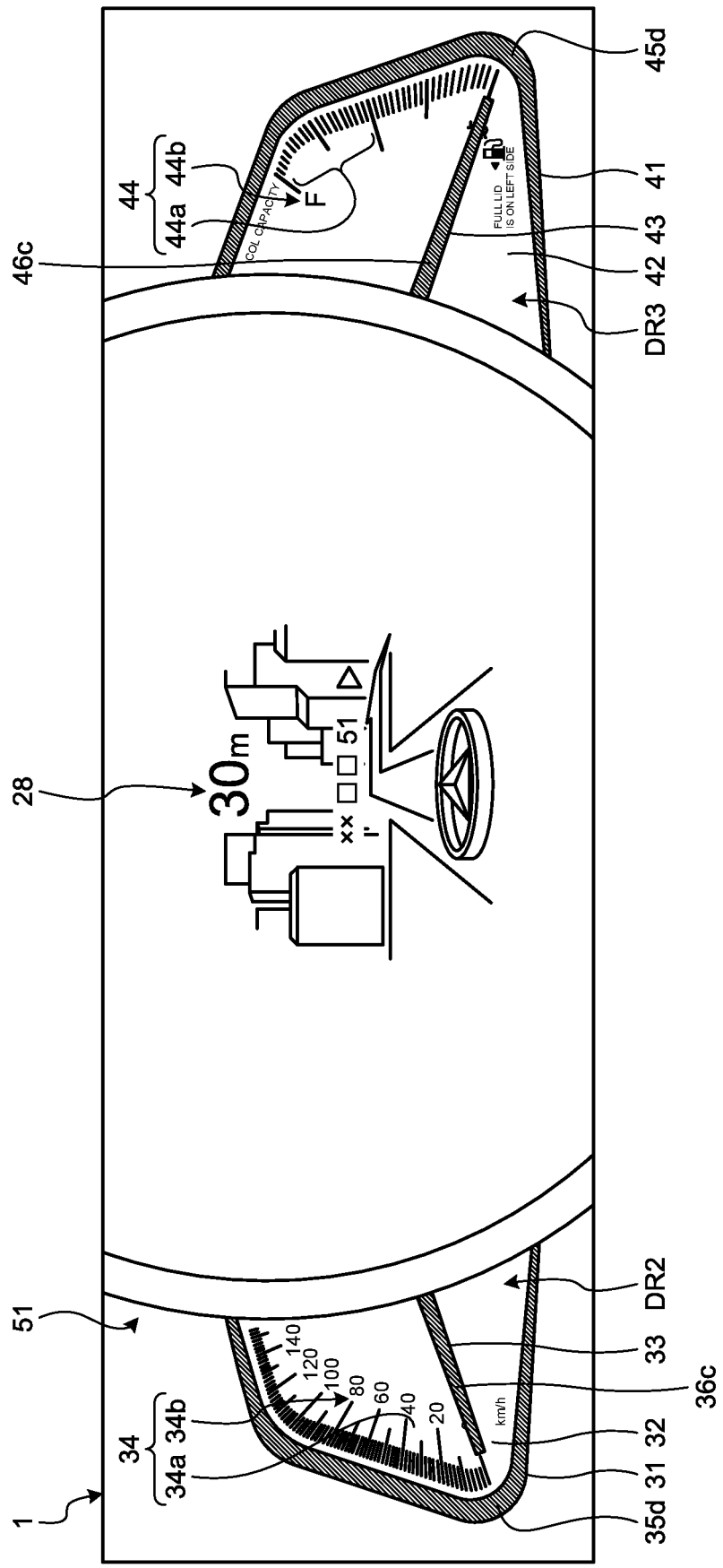

VEHICLE DISPLAY DEVICE

CROSS-REFERENCE TO RELATED APPLICATION(S)

The present application claims priority to and incorporates by reference the entire contents of Japanese Patent Application No. 2017-058899 filed in Japan on Mar. 24, 2017.

BACKGROUND OF THE INVENTION

1. Field of the Invention

The present invention relates to a vehicle display device.

2. Description of the Related Art

Conventionally, a vehicle display device having a physical element such as a frame surrounding a display region is known in the art. Japanese Patent Application Laid-open No. 2006-132950 discloses a technique of a vehicle display device having a ring-shaped display partition member. In the technique of Japanese Patent Application Laid-open No. 2006-132950, a display design image corresponding to a substantially circular dial plate indicating measurement values regarding a vehicle travel state is displayed in an LCD display region surrounded by an opening of the ring-shaped display partition member.

In order to improve designability of the vehicle display device, there is still room for improvement. For example, if appearance of the physical element of the vehicle display device can be changed, designability can be further improved.

SUMMARY OF THE INVENTION

An object of the invention is to provide a vehicle display device capable of improving designability.

In order to achieve the above mentioned object, a vehicle display device according to one aspect of the present invention includes a display unit having a pointer, a dial plate as a background of the pointer, and a frame surrounding the dial plate, at least one of the pointer, the dial plate, and the frame being a physical element; and a virtual image display device that displays a virtual image overlapping with the physical element, wherein the virtual image display device changes at least one of a color and a design of the virtual image overlapping with the physical element.

According to another aspect of the present invention, in the vehicle display device, it is preferable that an element other than the physical element, among the pointer, the dial plate, and the frame, is the virtual image displayed by the virtual image display device.

According to still another aspect of the present invention, in the vehicle display device, it is preferable that the display unit has at least one of the dial plate and the frame as the physical element, and the virtual image display device displays a virtual image of a scale overlapping with the physical element, the scale being indicated by the pointer.

According to still another aspect of the present invention, in the vehicle display device, it is preferable that the virtual image display device selectively displays the scales of different indexes.

According to still another aspect of the present invention, it is preferable that the vehicle display device further includes a light source, wherein the frame is the physical element, and the light source irradiates the frame.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is another diagram describing the display state depending on the surrounding environment;

FIG. 14 is still another diagram describing the display state depending on the surrounding environment;

FIG. 15 is a diagram illustrating an exemplary display state in which a light source is turned off; and FIG. 16 is a diagram illustrating another exemplary display state in which the light source is turned off.

DETAILED DESCRIPTION OF THE PREFERRED EMBODIMENTS

A vehicle display device according to an embodiment of the invention will now be described in details with reference to the accompanying drawings. Note that the embodiments are not intended to limit the invention. In addition, constituents of the embodiments described below include those easily conceived by an ordinary person skilled in the art or substantially similar ones.

Embodiment

Figure 1:
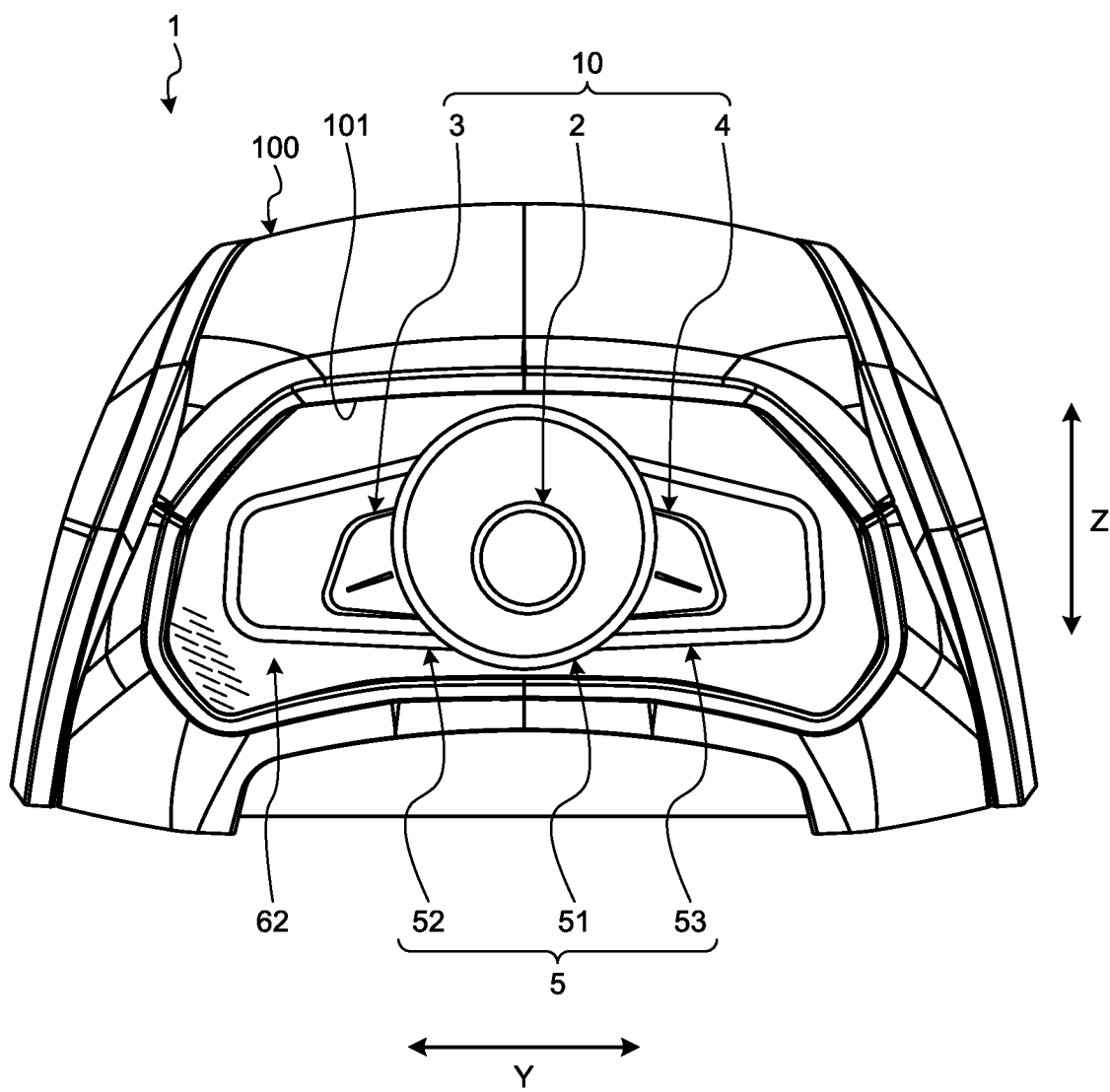
FIG. 1 is a front view illustrating a vehicle display device according to an embodiment.
Figure 2:
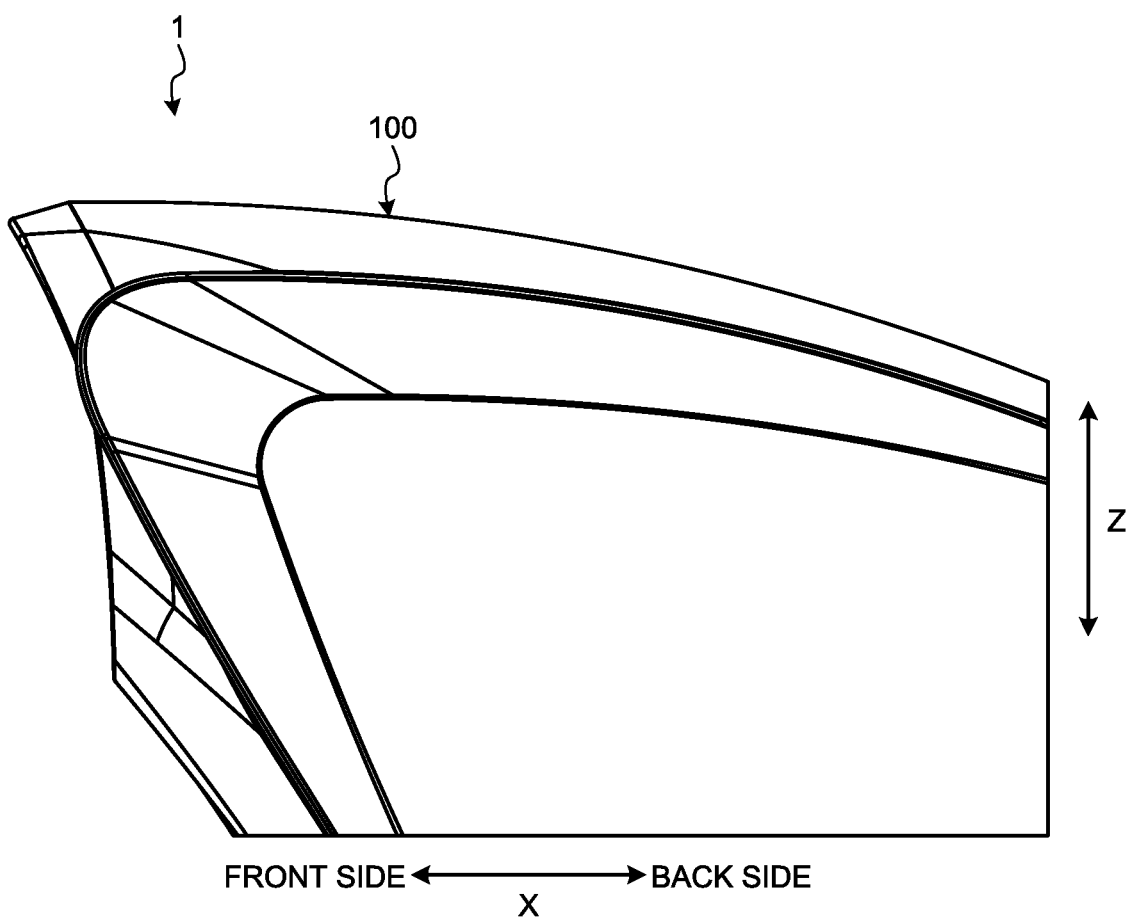
FIG. 2 is a side view illustrating the vehicle display device according to the embodiment.
Figure 3:
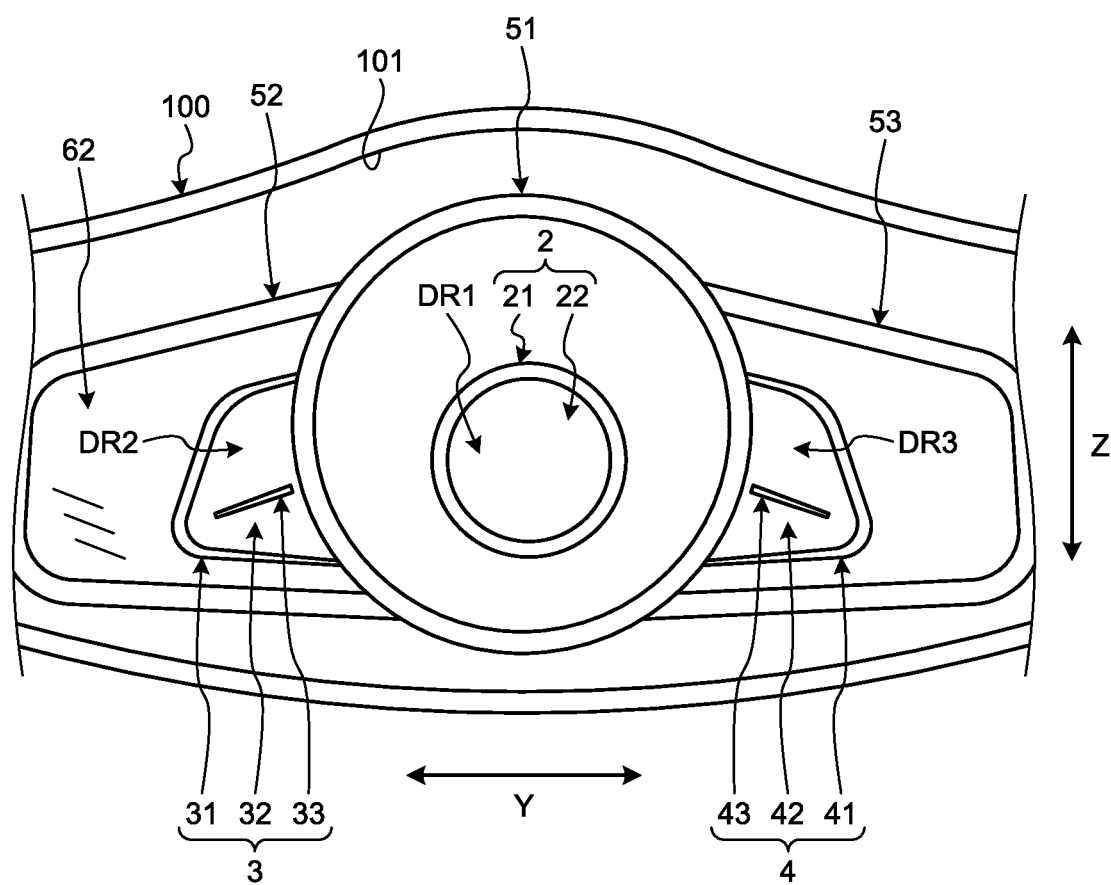
FIG. 3 is an enlarged front view illustrating the vehicle display device according to the embodiment.
Figure 4:
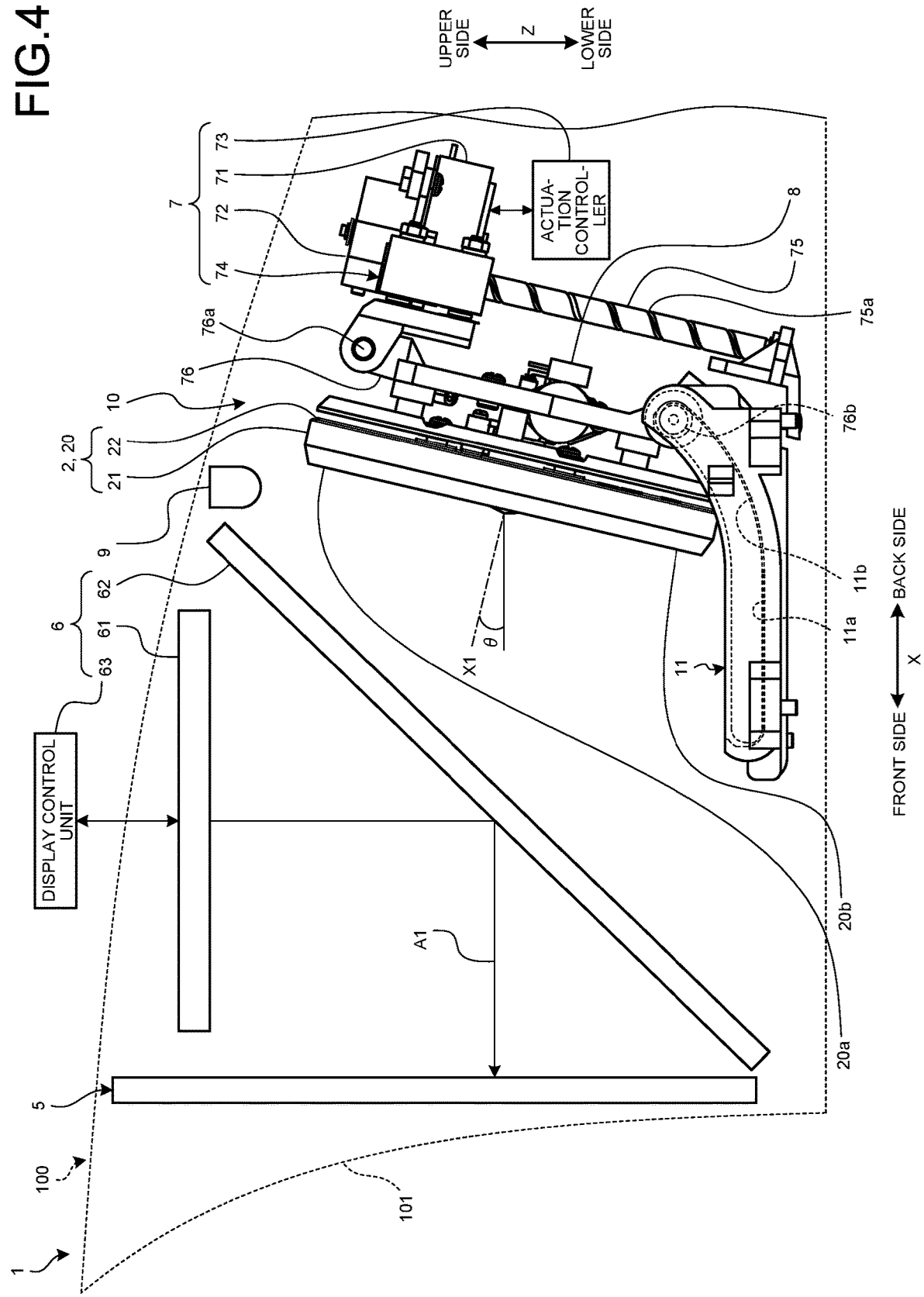
FIG. 4 is a side view illustrating an internal configuration of the vehicle display device according to the embodiment.
Figure 5:
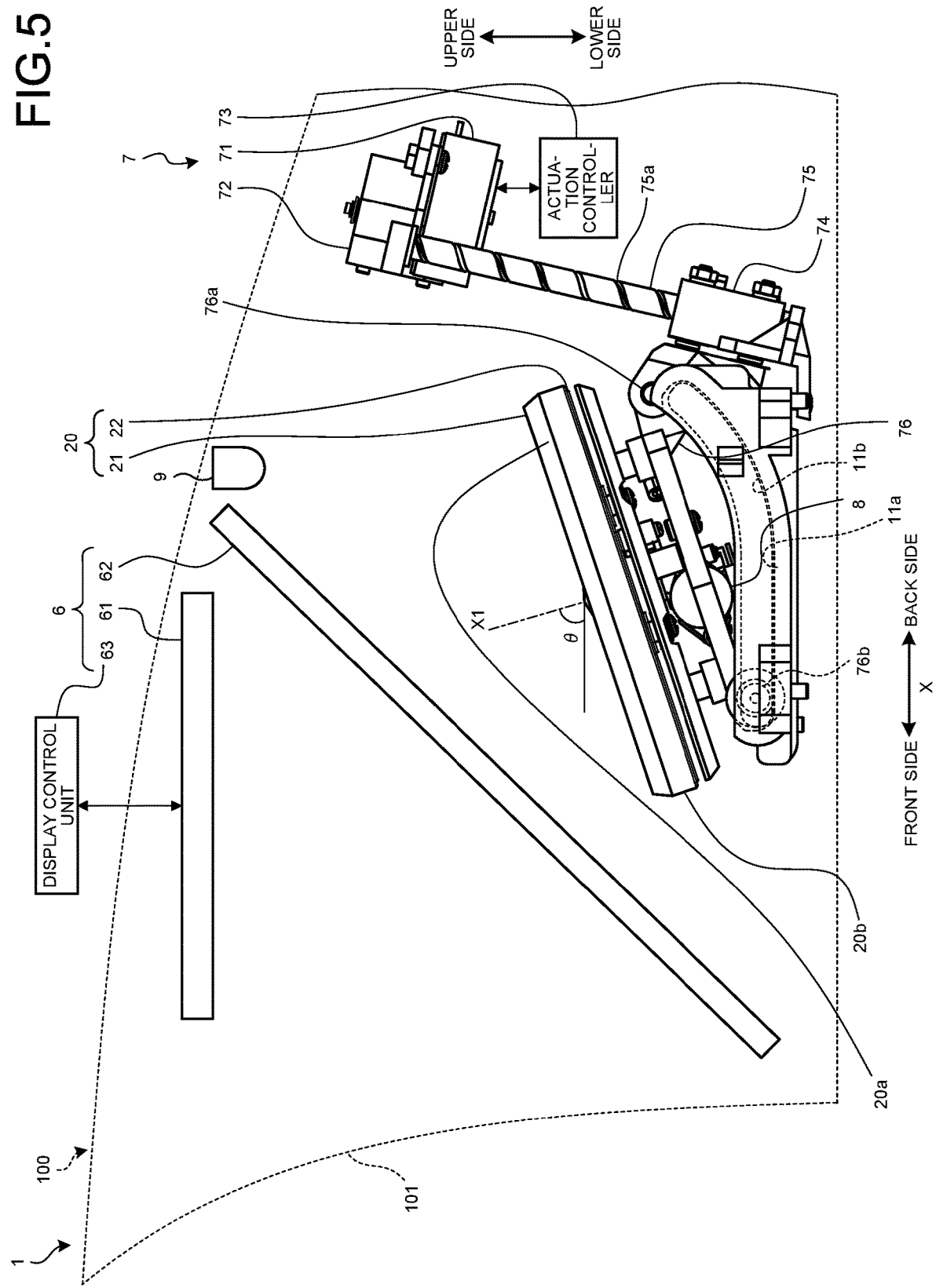
FIG. 5 is another side view illustrating an internal configuration of the vehicle display device according to the embodiment.
Figure 6:
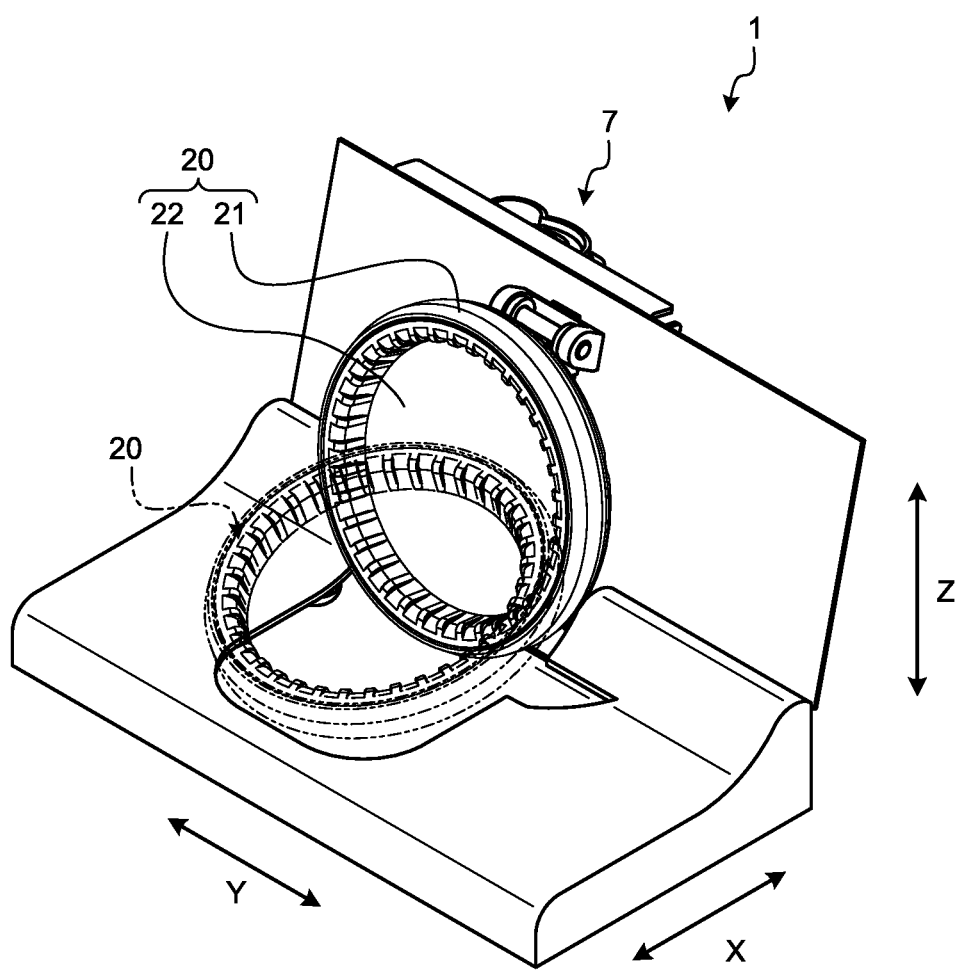
FIG. 6 is a perspective view illustrating operations of a movable member according to the embodiment.
Figure 7:
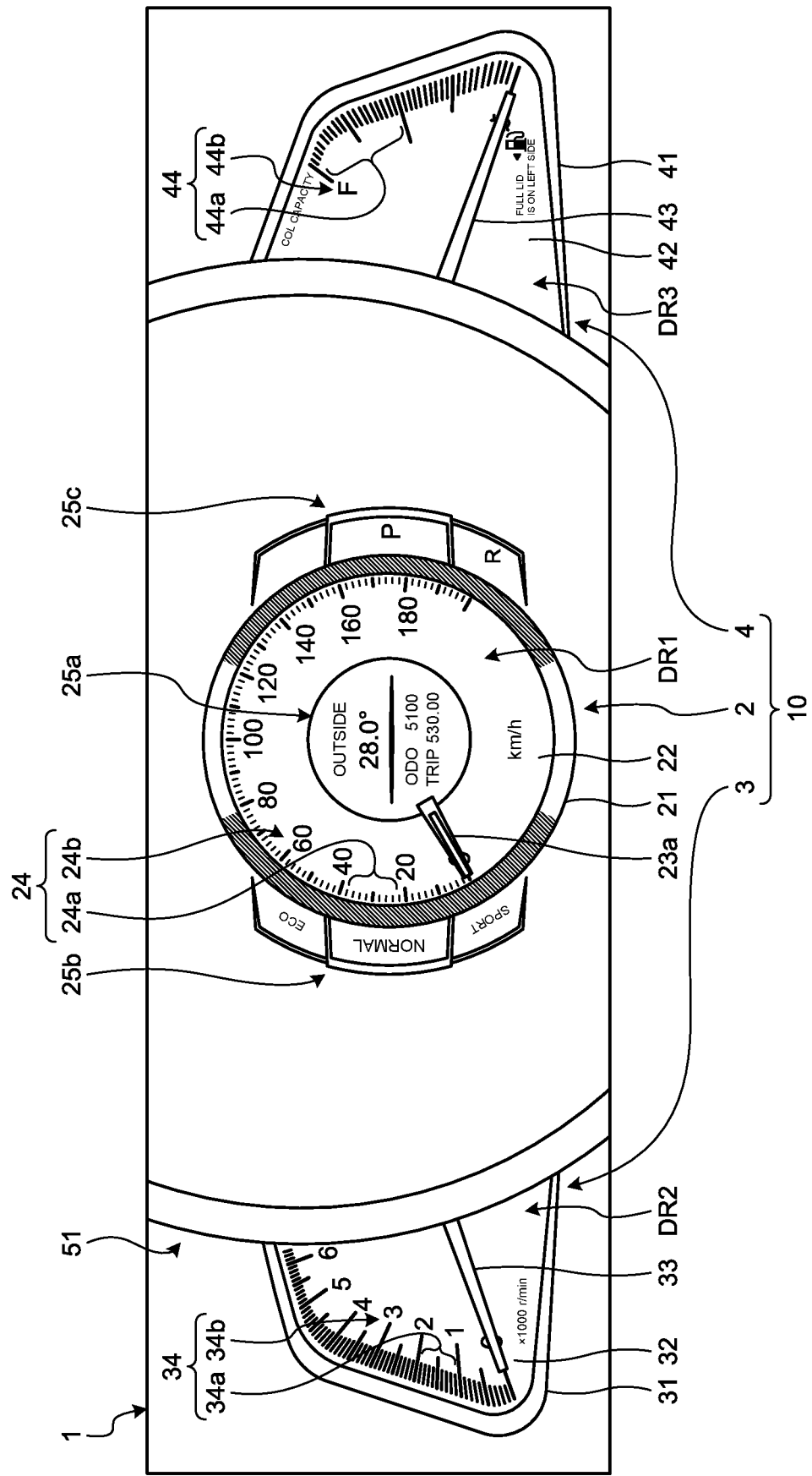
FIG. 7 is a diagram illustrating an exemplary display state of the vehicle display device according to the embodiment.
Figure 8:
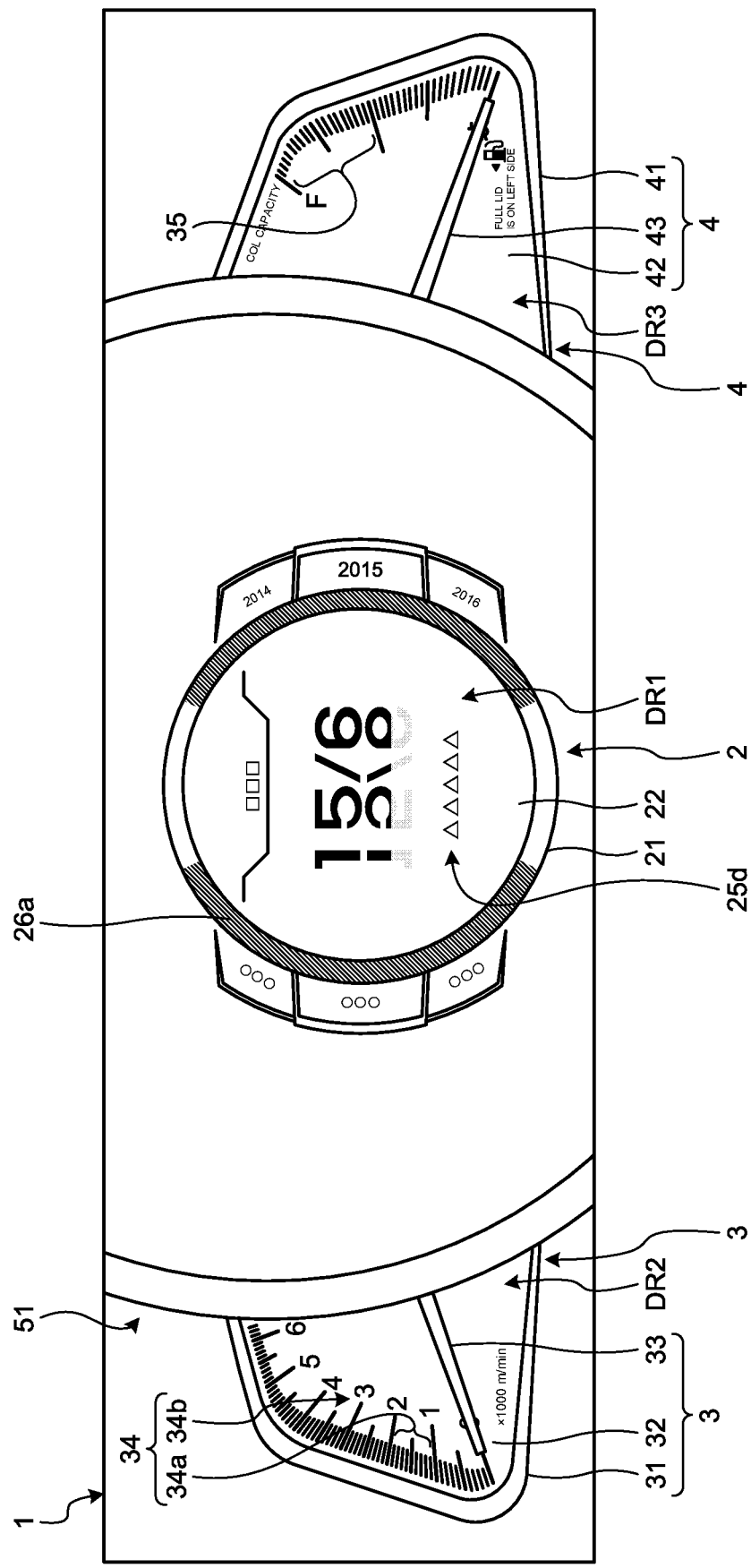
FIG. 8 is a diagram illustrating a state in which a virtual image is overlapped on a first frame according to the embodiment.
Figure 9:
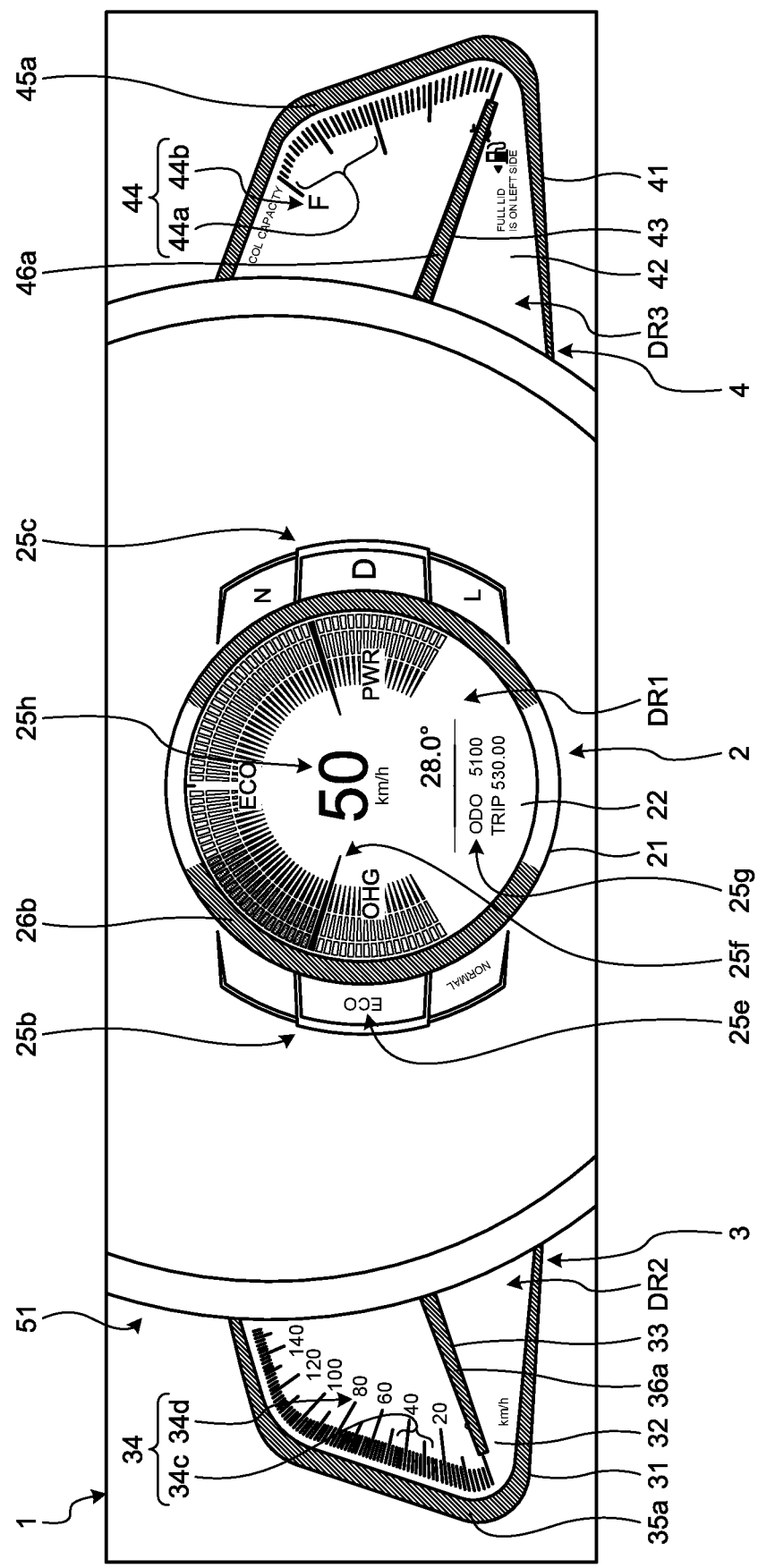
FIG. 9 is a diagram illustrating a state in which virtual images are overlapped on objects of overlapping according to the embodiment.

Embodiment of the invention will now be described with reference to FIGS. 1 to 16. The embodiments relate to a vehicle display device. FIG. 1 is a front view illustrating a vehicle display device according to an embodiment. FIG. 2 is a side view illustrating the vehicle display device according to the embodiment. FIG. 3 is an enlarged front view illustrating the vehicle display device according to the embodiment. FIG. 4 is a side view illustrating an internal configuration of the vehicle display device according to the embodiment. FIG. 5 is another side view illustrating an internal configuration of the vehicle display device according to the embodiment. FIG. 6 is a perspective view illustrating operations of a movable member according to the embodiment. FIG. 7 is a diagram illustrating an exemplary display state of the vehicle display device according to the embodiment. FIG. 8 is a diagram illustrating a state in which a virtual image is overlapped on a first frame according to the embodiment. FIG. 9 is a diagram illustrating a state in which virtual images are overlapped on objects of overlapping according to the embodiment.

A vehicle display device 1 according to this embodiment is mounted on a vehicle such as an automobile. As illustrated in FIGS. 1 to 4, the vehicle display device 1 according to this embodiment includes a casing 100, a display unit 10, a decorating member 5, a virtual image display device 6, an actuator unit 7, a second actuator unit 8, and a light source 9. The casing 100 is a cylindrical member having a closed end. The casing 100 is formed of metal, synthetic resin, or the like. The casing 100 is placed in a front side with respect to a driver's seat of the vehicle in a front-rear direction of the vehicle. The casing 100 is placed, for example, in an opening of a dial plate. The casing 100 is a trapezoidal member as seen in a front view.

The casing 100 has an opening 101 facing a driver's seat. In the description of the vehicle display device 1, a "depth direction X" refers to an axial direction of the casing 100. The depth direction X is typically a front-rear direction of the vehicle. In the depth direction X, a "front side" refers to a driver's seat side which is typically a rear side of the vehicle. In the depth direction X, a "back side" refers to a side opposite to the driver's seat which is typically a head side of the vehicle. The opening 101 is provided in a front surface of the casing 100. In addition, a "height direction Z" refers to a height direction of the casing 100 while the casing 100 is arranged in the vehicle and is typically a vertical direction. A "width direction Y" refers to a direction perpendicular to the depth direction X and the height direction Z and is typically a vehicle width direction. In the width direction Y, a "left side" refers to the left side as seen from the driver's seat and is typically a left side of the vehicle. In the width direction Y, a "right side" refers to the right side as seen from the driver's seat and is typically a right side of the vehicle.

The opening 101 has a length of the width direction Y longer than a length of the height direction Z. The decorating member 5 is arranged in the opening 101. The decorating member 5 faces the driver's seat in the depth direction X. The decorating member 5 is formed of, for example, metal, synthetic resin, or the like. The decorating member 5 has a first decorating portion 51, a second decorating portion 52, and a third decorating portion 53. The three decorating portions 51, 52, and 53 may be formed integrally. The decorating member 5 is supported by the casing 100. The first to third decorating portions 51 to 53 have exterior shapes corresponding to those of first to third display units 2 to 4 described below.

The first decorating portion 51 has a circular annular shape. The first decorating portion 51 is arranged in the center of the width direction Y of the opening 101. In addition, the first decorating portion 51 is arranged in the center of the height direction Z of the opening 101. The first decorating portion 51 has a diameter slightly smaller than the width in the height direction Z of the opening 101.

The second decorating portion 52 is arranged on the left side in the width direction Y with respect to the first decorating portion 51. The second decorating portion 52 is arranged on the backside of the first decorating portion 51 and in the vicinity of the first decorating portion 51. The second decorating portion 52 has a U-shape tilted to the right side or a C-shape. An opened portion of the second decorating portion 52 faces the first decorating portion 51. A right end portion of the second decorating portion 52 is hidden behind the first decorating portion 51.

The third decorating portion 53 is arranged on the right side in the width direction Y with respect to the first decorating portion 51. The third decorating portion 53 is arranged on the backside of the first decorating portion 51 and in the vicinity of the first decorating portion 51. The third decorating portion 53 has a U-shape tilted to the left side or a C-shape reversed in the left-right direction. An opened portion of the third decorating portion 53 faces the first decorating portion 51. A left end portion of the third decorating portion 53 is hidden behind the first decorating portion 51.

The display unit 10 is arranged on the backside in the depth direction X with respect to the decorating member 5. The display unit 10 according to this embodiment is arranged in a deep side of the internal space of the casing 100. The display unit 10 according to this embodiment has a first display unit 2, a second display unit 3, and a third display unit 4. The first display unit 2 has a first frame 21 and a first dial plate 22 as illustrated in FIG. 3. The first frame 21 and the first dial plate 22 are formed of, for example, synthetic resin or metal. According to this embodiment, the first frame 21 is formed of metal such as aluminum, and the first dial plate 22 is formed of synthetic resin. The first frame 21 has a light color such as silver or white. When the first frame 21 is formed of resin, plating having a light color may be applied to a surface of the first frame 21. The surface of the first frame 21 may be subjected to a mirror finish or matted finish. The first frame 21 according to this embodiment has a circular annular shape.

The first dial plate 22 is a disk-shaped element. The first dial plate 22 blocks a region inward of the first frame 21 from the backside. The first dial plate 22 has a deep color such as black. The surface of the first dial plate 22 may be subjected to a matted finish. In the first display unit 2, the first frame 21 and the first dial plate 22 are physical elements. A first display region DR1 is formed such that it is surrounded and delimited by the ring-shaped first frame 21.

The second display unit 3 has a second frame 31, a second dial plate 32, and a second pointer 33. The second frame 31 is arranged on the left side in the width direction Y with respect to the first frame 21. The second frame 31 is arranged in a region surrounded by the first decorating portion 51 and the second decorating portion 52. The second frame 31 has a U-shape tilted to the right side or a C-shape. An end portion of the opening side of the second frame 31 is hidden behind the left end portion of the first decorating portion 51. The second frame 31 and the first decorating portion 51 constitute a second display region DR2 delimited from the surroundings. The second pointer 33 is arranged in the second display region DR2. In the second display unit 3, the second frame 31, the second dial plate 32, and the second pointer 33 are physical elements.

The second frame 31, the second dial plate 32, and the second pointer 33 are formed of, for example, synthetic resin or metal. According to this embodiment, the second frame 31 is formed of metal such as aluminum, and the second dial plate 32 and the second pointer 33 are formed of synthetic resin. The second frame 31 has a light color such as silver or white. When the second frame 31 is formed of resin, plating of a light color may be applied to a surface of the second frame 31. The surface of the second frame 31 may be subjected to a mirror finish or matted finish. The second dial plate 32 has a shape corresponding to the shape of the second frame 31. The second dial plate 32 covers the region surrounded by the second frame 31 from the backside of the second frame 31. The second dial plate 32 has a deep color such as black. The surface of the second dial plate 32 may be subjected to a matted finish. The second pointer 33 has a light color such as silver or white. The second pointer 33 may be transparent at least partially.

The third display unit 4 has a third frame 41, a third dial plate 42, and a third pointer 43. The third frame 41 is arranged on the right side in the width direction Y with respect to the first frame 21. The third frame 41 is arranged in a region surrounded by the first decorating portion 51 and the third decorating portion 53. The third frame 41 has a U-shape tilted to the left side or a C-shape reversed in the left-right direction. An end portion of the opening side of the third frame 41 is hidden behind a right end portion of the first decorating portion 51. The third frame 41 and the first decorating portion 51 constitute a third display region DR3 delimited from the surroundings. The third pointer 43 is arranged in the third display region DR3. In the third display unit 4, the third frame 41, the third dial plate 42, and the third pointer 43 are physical elements.

The third frame 41, the third dial plate 42, and the third pointer 43 are formed of, for example, synthetic resin or metal. According to this embodiment, the third frame 41 is formed of metal such as aluminum, and the third dial plate 42 and the third pointer 43 are formed of synthetic resin. The third frame 41 has a light color such as silver or white. When the third frame 41 is formed of resin, a surface of the third frame 41 may be subjected to plating of a light color. The surface of the third frame 41 may be subjected to a mirror finish or matted finish. The third dial plate 42 has a shape corresponding to the shape of the third frame 41. The third dial plate 42 covers the region surrounded by the third frame 41 from the backside of the third frame 41. The third dial plate 42 has a deep color such as black. The surface of the third dial plate 42 may be subjected to a matted finish. The third pointer 43 has a light color such as silver or white. The third pointer 43 may be transparent at least partially.

As illustrated in FIG. 4, the virtual image display device 6 has a display device 61, a half mirror 62, and a display control unit 63. The half mirror 62 is a semi-transparent member. The half mirror 62 reflects a part of an incident light and transmits the other part of the incident light. The half mirror 62 has a main body formed of transparent resin or glass and a half mirror layer. The half mirror layer is a metal or inorganic multilayer film formed on a surface of the main body through deposition or the like. The half mirror 62 is arranged between the decorating member 5 and the display unit 10 in the depth direction X. The half mirror 62 is inclined toward the backside in the depth direction X as it goes upward in the height direction Z. The half mirror 62 is held by the casing 100 in the inclined posture described above.

The display device 61 projects an image toward the half mirror 62. The display device 61 is controlled by the display control unit 63. The display device 61 is a liquid crystal display device such as a thin-film transistor liquid crystal display (TFT-LCD). The display device 61 is arranged over the half mirror 62 in the height direction Z. In addition, the display device 61 faces the half mirror 62 in the height direction Z. The image projected from the display device 61 is reflected by the half mirror 62 toward the front surface side in the depth direction X as indicated by the arrow A1. The image reflected on the half mirror 62 is recognized as a virtual image focused in the backside of the half mirror 62 as seen from a driver sitting on the driver's seat. The position where the virtual image forms is placed, for example, in the front surface of the display unit 10 or slightly on the front side or the back side of the front surface of the display unit 10.

In the vehicle display device 1 according to this embodiment, the first frame 21 and the first dial plate 22 are movable. In the following description, the first frame 21 and the first dial plate 22 will be collectively referred to as a "movable member 20". The vehicle display device 1 has an actuator unit 7 and a second actuator unit 8 for moving the movable member 20. The movable member 20 can be placed in an upright position of FIG. 4 and a tilt position of FIG. 5. The movable member 20 may stop in a position between the upright and tilt positions. The upright position is a position where the movable member 20 faces a driver on the driver's seat. When the movable member 20 is in the upright position, a slope angle $\theta$ of the axial direction X1 of the movable member 20 against the depth direction X becomes minimized. The movable member 20 placed in the upright position is sloped such that an upper end portion 20a is placed slightly behind a lower end portion 20b. The tilt position of FIG. 5 is a position where the movable member 20 faces the display device 61. When the movable member 20 is in the tilt position, the slope angle $\theta$ of the axial direction X1 of the movable member 20 against the depth direction X becomes maximized.

The actuator unit 7 has a power source 71, a power transmission mechanism 72, an actuation controller 73, and a converting member 74. The actuator unit 7 is arranged in the backside of the movable member 20. The power source 71 is, for example, a rotary motor. The power transmission mechanism 72 rotates a shaft member 75 by a rotation force output from the power source 71. By rotation of the shaft member 75, the converting member 74 reciprocates along the axial direction of the shaft member 75. The shaft member 75 is a columnar member extending along the height direction Z. The shaft member 75 is inclined such that an upper end portion is placed slightly on the backside of a lower end portion. The slope angle of the shaft member 75 corresponds to the slope angle of the movable member 20 placed in the upright position. A spiral thread 75a is formed on an outer circumferential surface of the shaft member 75. The converting member 74 has a nut-like rotatable member engaged with the thread 75a. This rotatable member converts a rotational motion of the shaft member 75 into a rectilinear motion along the axial direction of the shaft member 75. The converting member 74 moves in the height direction Z along the shaft member 75 as the shaft member 75 turns around the axial line.

The converting member 74 is connected to the movable member 20 via a holding member 76. The holding member 76 is connected to the backside of the movable member 20 and moves in the height direction Z along with the movable member 20. The converting member 74 and the upper end portion of the holding member 76 are connected to each other via a rotation shaft 76a. A central axial line of the rotation shaft 76a is directed in the width direction Y. The holding member 76 is rotatable around the rotation shaft 76a.

A guided portion 76b is provided in the lower end of the holding member 76. The guided portion 76b is provided on both sides in the width direction Y of the holding member 76. The guided portion 76b according to this embodiment is a rotating body such as a wheel or the like rotatably supported. A guide member 11 for guiding the guided portion 76b is arranged inside the casing 100. The guide member 11 has a guide rail 11a. The guided portion 76b is inserted into the guide rail 11a and rolls along the guide rail 11a. The guide rail 11a extends along the depth direction X as a whole. An arcuate portion 11b is provided in the end on the backside of the guide rail 11a. The arcuate portion 11b is curved so as to head upward in the height direction Z toward the backside of the depth direction X.

The actuation controller 73 controls a magnitude and a rotation direction of the rotation force output from the power source 71. As illustrated in FIG. 4, when the movable member 20 is placed in the upright position, the guided portion 76b is placed in the end on the backside of the guide rail 11a. In this case, the converting member 74 is positioned in the upper end of the shaft member 75. When the movable member 20 moves from the upright position to the tilt position, the actuation controller 73 controls the power source 71 such that the converting member 74 moves downward. More specifically, the actuation controller 73 rotates the shaft member 75 by the power source 71 in a rotation direction in which the converting member 74 moves downward.

As the converting member 74 moves downward along the shaft member 75, the guided portion 76b is guided by the guide rail 11a and moves toward the front side. As the converting member 74 moves downward, the lower end portion 20b of the movable member 20 relatively moves away from the shaft member 75 to the front side. As a result, the slope angle of the movable member 20 with respect to the height direction Z increases. The actuation controller 73 stops the output of the power source 71 when the movable member 20 reaches the tilt position.

When the movable member 20 moves from the tilt position to the upright position, the actuation controller 73 controls the power source 71 so as to move the converting member 74 upward. More specifically, the actuation controller 73 rotates the shaft member 75 by the power source 71 in a rotation direction in which the converting member 74 moves upward. As the converting member 74 moves upward along the shaft member 75, the guided portion 76b is guided by the guide rail 11a and moves toward the backside. As the converting member 74 moves upward, the lower end portion 20b of the movable member 20 relatively moves toward the backside so as to approach the shaft member 75. As a result, the slope angle of the movable member 20 with respect to the height direction Z decreases. When the movable member 20 reaches the upright position, the actuation controller 73 stops the output of the power source 71.

The vehicle display device 1 according to this embodiment further has the second actuator unit 8 for moving the movable member 20 in the width direction Y. The second actuator unit 8 is placed in the holding member 76. The second actuator unit 8 has a second power source such as a motor and a second power transmission mechanism. The second power transmission mechanism converts a rotational motion caused by the output power of the second power source into a rectilinear motion along the width direction Y. The second actuator unit 8 is interposed between the holding member 76 and the movable member 20. The second actuator unit 8 causes the movable member 20 to relatively move with respect to the holding member 76 in the width direction Y.

As illustrated in FIG. 4, the light source 9 is arranged in an upper part of the internal space of the casing 100 in the height direction Z. The light source 9 is arranged over the display unit 10 in the height direction Z. That is, the light source 9 irradiates the physical elements of the display unit 10 with light from the top. In the vehicle display device 1 according to this embodiment, at least one light source 9 is provided in each of the first display unit 2, the second display unit 3, and the third display unit 4. The light source 9 corresponding to the first display unit 2 irradiates the first frame 21 and the first dial plate 22 with light. The light source 9 corresponding to the second display unit 3 irradiates the second frame 31, the second dial plate 32, and the second pointer 33 with light. The light source 9 corresponding to the third display unit 4 irradiates the third frame 41, the third dial plate 42, and the third pointer 43 with light.

FIG. 7 illustrates an exemplary display state of the vehicle display device 1. A first pointer image 23a, an index image 24, and an information image 25a are displayed in the first display region DR1 surrounded by the first frame 21. The first pointer image 23a, the index image 24, and the information image 25a are virtual images displayed by the virtual image display device 6. The index image 24 includes a scale image 24a and a character image 24b. The index image 24 is displayed along an inner circumferential surface of the first frame 21. The index image 24 of FIG. 7 is an index image for showing a vehicle speed which is a travel speed of the vehicle.

The first pointer image 23a indicates the index image 24. More specifically, the first pointer image 23a is displayed in a position that indicates a scale image 24a corresponding to a current vehicle speed among a plurality of scale images 24a. Note that, when the first pointer image 23a and the index image 24 are overlapped, a part of the index image 24 overlapping with the first pointer image 23a is not displayed. That is, the display device 61 creates the display image such that the first pointer image 23a is placed in front of the index image 24 in the depth direction X.

The information image 25a is displayed in the center of the first display region DR1. The information image 25a includes a circular frame image and a character image. The character image of the information image 25a contains characters indicating information regarding an external air temperature or a travel distance.

Information images 25b and 25c are displayed around the first frame 21. The information images 25b and 25c are virtual images displayed by the virtual image display device 6. The information image 25b is displayed on the left side of the first frame 21. The information image 25c is displayed on the right side of the first frame 21. The information image 25b includes characters indicating a current travel mode of the vehicle. The information image 25c includes characters indicating a current gearshift position of the vehicle.

An index image 34 is displayed in the second display region DR2. The index image 34 is a virtual image displayed by the virtual image display device 6. The index image 34 includes a scale image 34a and a character image 34b. The index image 34 is displayed along the side surface of the second frame 31. The index image 34 of FIG. 7 is an index image for a rotation speed of the engine mounted on the vehicle. The index image 34 is indicated by a second pointer 33. Note that the virtual image display device 6 does not display the index image 34 in a portion overlapping with the second pointer 33. That is, the virtual image display device 6 visualizes the index image 34 as a background of the second pointer 33.

An index image 44 is displayed in the third display region DR3. The index image 44 is a virtual image displayed by the virtual image display device 6. The index image 44 includes a scale image 44*a* and a character image 44*b*. The index image 44 is displayed along the side surface of the third frame 41. The index image 44 of FIG. 7 is an index image for a remaining fuel amount of the vehicle. The index image 44 is indicated by a third pointer 43. Note that the virtual image display device 6 does not display the index image 44 in a portion overlapping with the third pointer 43. That is, the virtual image display device 6 visualizes the index image 44 as a background of the third pointer 43.

The virtual image display device 6 according to this embodiment displays the virtual image overlapping with the physical elements of the display unit 10. The virtual image display device 6 makes the virtual image overlap with objects such as the first frame 21, the first dial plate 22, the second frame 31, the second dial plate 32, the second pointer 33, the third frame 41, the third dial plate 42, and the third pointer 43. The virtual image display device 6 may display the virtual image overlapping with at least one of these objects (hereinafter, simply referred to as an "overlapping object"). The virtual image display device 6 according to this embodiment displays the virtual image overlapping with an arbitrary overlapping object. The virtual image display device 6 may make the virtual image overlap with overall of the overlapping objects or with a part of the overlapping objects. The virtual image display device 6 changes at least one of the color and design of the virtual image overlapping with the overlapping object. Therefore, the vehicle display device 1 according to this embodiment can improve designability by changing at least one of the color and design of the physical elements.

Note that the process of changing the color or the design of the virtual image includes not only a process of changing the color or the design depending on the time elapse but also a process of displaying a virtual image having a different color or design depending on the travel mode or the surrounding environment of the vehicle as described below.

FIG. 8 illustrates a state in which a colored virtual image is displayed overlapping with the first frame 21. A colored frame image 26*a* is displayed overlapping with the first frame 21. The shape of the frame image 26*a* is corresponding to the shape of the first frame 21. The color of the frame image 26*a* is different from, for example, the original color of the first frame 21. The color of the frame image 26*a* may also be identical or similar to that of an information image 25*d* displayed in the first display region DR1.

FIG. 9 illustrates a state in which virtual images having the same color are overlapped with a plurality of overlapping objects. A frame image 26*b* is a virtual image displayed overlapping with the first frame 21. A frame image 35*a* is a virtual image displayed overlapping with the second frame 31. The shape of the frame image 35*a* is corresponding to the shape of the second frame 31. A frame image 45*a* is a virtual image displayed overlapping with the third frame 41. The shape of the frame image 45*a* is corresponding to the shape of the third frame 41. The virtual image display device 6 sets the colors of the three frame images 26*b*, 35*a*, and 45*a* to be identical or similar to each other. In this case, a sense of unity in appearance is created between the three display units 2, 3, and 4, so that designability is improved.

In FIG. 9, a pointer image 36*a* is a virtual image displayed overlapping with the second pointer 33. A pointer image 46*a* is a virtual image displayed overlapping with the third pointer 43. The virtual image display device 6 sets the colors of the two pointer images 36*a* and 46*a* to be identical or similar to each other. In this case, a sense of unity in appearance is created between at least the two display units 3 and 4, so that designability is improved.

The virtual image display device 6 may set the colors of the frame images 26*b*, 35*a*, and 45*a* and the colors of the pointer images 36*a* and 46*a* to be identical or similar to each other. In this case, a sense of unity between the three display units 2, 3, and 4 is further improved. Note that, when the first pointer image 23*a* is displayed in the first display region DR1, the virtual image display device 6 may set the color of the first pointer image 23*a* to be identical or similar to the colors of the pointer images 36*a* and 46*a*.

The colors of the frame images 26*b*, 35*a*, and 45*a* and the colors of the pointer images 36*a* and 46*a* are set, for example, to the color corresponding to travel mode of the vehicle. In FIG. 9, the information image 25*b* is displayed by indicating that the current travel mode is an eco-mode. When the eco-mode is set in the vehicle, the colors of the frame images 26*b*, 35*a*, and 45*a* and the colors of the pointer images 36*a* and 46*a* are set to the color corresponding to the eco-mode. The color of the eco-mode is set as, for example, a blue series color. A color of the character image 25*e* that indicates the eco-mode is the color corresponding to the eco-mode.

Information images 25*f*, 25*g*, and 25*h* are displayed in the first display region DR1. The information images 25*f*, 25*g*, and 25*h* are virtual images displayed by the virtual image display device 6. The information image 25*f* is an indicator indicating a load of the vehicle. The color of the information image 25*f* is, for example, identical or similar to the colors of the frame images 26*b*, 35*a*, and 45*a* or the like. The information image 25*g* is a character image indicating information on a travel distance. The information image 25*h* is a character image indicating a numerical value of the vehicle speed.

The index image 34 is displayed in the second display region DR2. The index image 34 of FIG. 9 is an index image regarding the vehicle speed. The index image 34 includes a scale image 34*c* and a character image 34*d* for the vehicle speed. In this manner, scale images 34*a* and 34*c* of other indexes such as the engine rotation speed or the vehicle speed are selectively displayed in the second display region DR2. Note that one of the scale images 34*a* and 34*c* may also be provided physically in the second dial plate 32. For example, the second dial plate 32 may be provided with the scale image 34*a* and the character image 34*b* through printing or the like in advance. When the scale image 34*c* and the character image 34*d* are displayed, a virtual image including the scale image 34*c* and the character image 34*d* of the vehicle speed is displayed so as to cover the scale image 34*a* and the character image 34*b* of the engine rotation speed.

Figure 10:
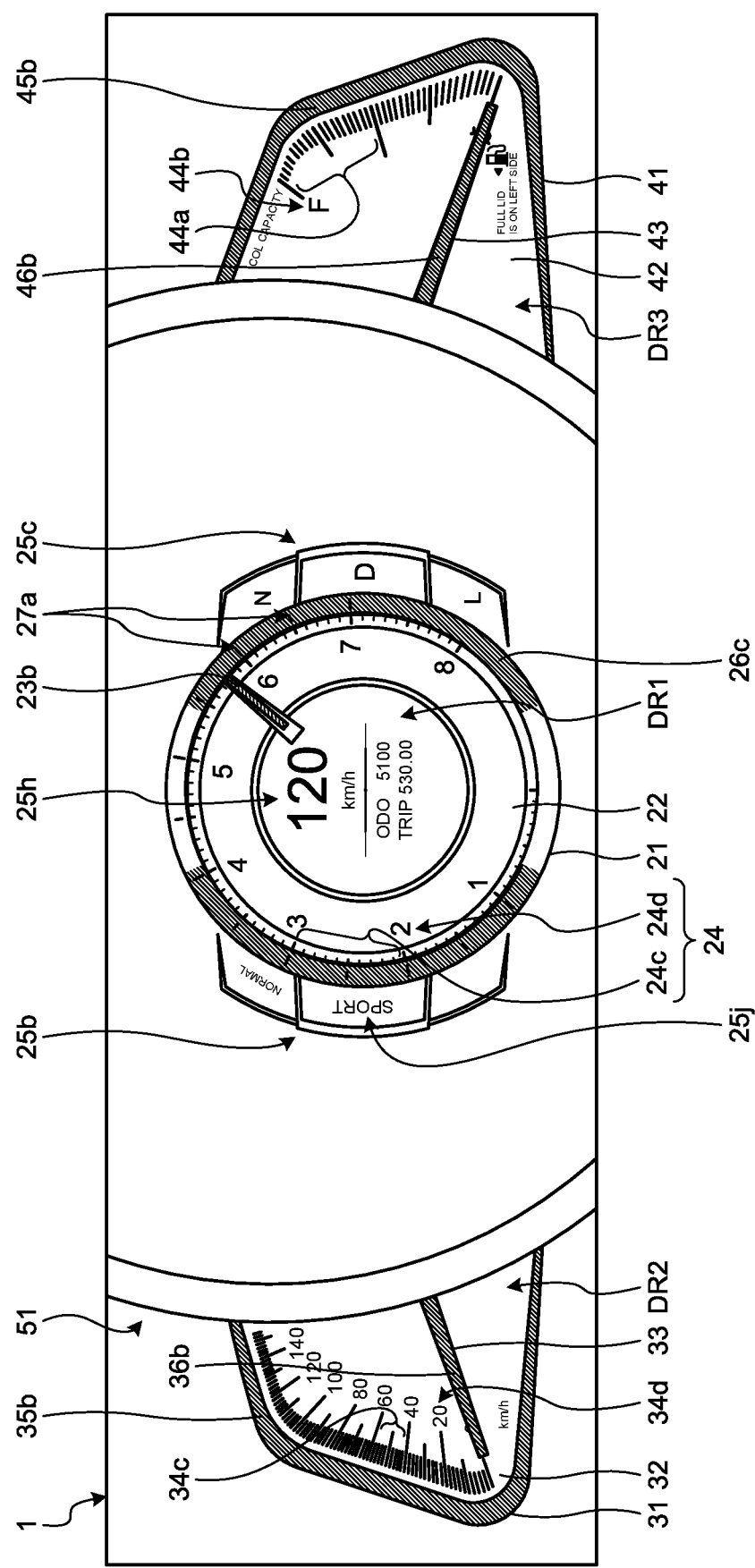
FIG. 10 is a diagram describing a display state depending on a travel mode.

FIG. 10 illustrates a display state in which a sports mode is selected. A frame image 26*c* overlapping with the first frame 21, a frame image 35*b* overlapping with the second frame 31, and a frame image 45*b* overlapping with the third frame 41 are displayed in the identical or similar color. The colors of the frame images 26*c*, 35*b*, and 45*b* are set to the color corresponding to the sports mode. The color of the sports mode is set as, for example, a red series color.

A pointer image 36*b* overlapping with the second pointer 33 and a pointer image 46*b* overlapping with the third pointer 43 are displayed in the identical or similar color. The colors of the pointer images 36*b* and 46*b* are set to the color corresponding to the sports mode. The color of a character image 25*j* indicating the sports mode is set to the color corresponding to the sports mode.

The index image 24 and a first pointer image 23*b* are displayed in the first display region DR1. The index image 24 of FIG. 10 is an index image for the engine rotation speed. The index image 24 includes a scale image 24*c* and a character image 24*d* for the engine rotation speed. As illustrated in FIGS. 7 and 10, scale images 24*a* and 24*c* or character images 24*b* and 24*d* of different indexes are selectively displayed in the first display region DR1. The first pointer image 23*b* is displayed in a position indicating the scale image 24*c* corresponding to the current engine rotation speed among a plurality of scale images 24*c*. The color of the first pointer image 23*b* is set to the color corresponding to the sports mode.

As illustrated in FIG. 10, a pattern image 27*a* is further overlappingly displayed on the first frame 21. A plurality of pattern images 27*a* are displayed along a circumferential direction of the first frame 21 at a predetermined interval. The pattern images 27*a* are displayed, for example, in a position corresponding to the position of the scale image 24*c*. The pattern image 27*a* of FIG. 10 is an image of a line segment displayed on an extended line of the scale image 24*c*.

Figure 11:
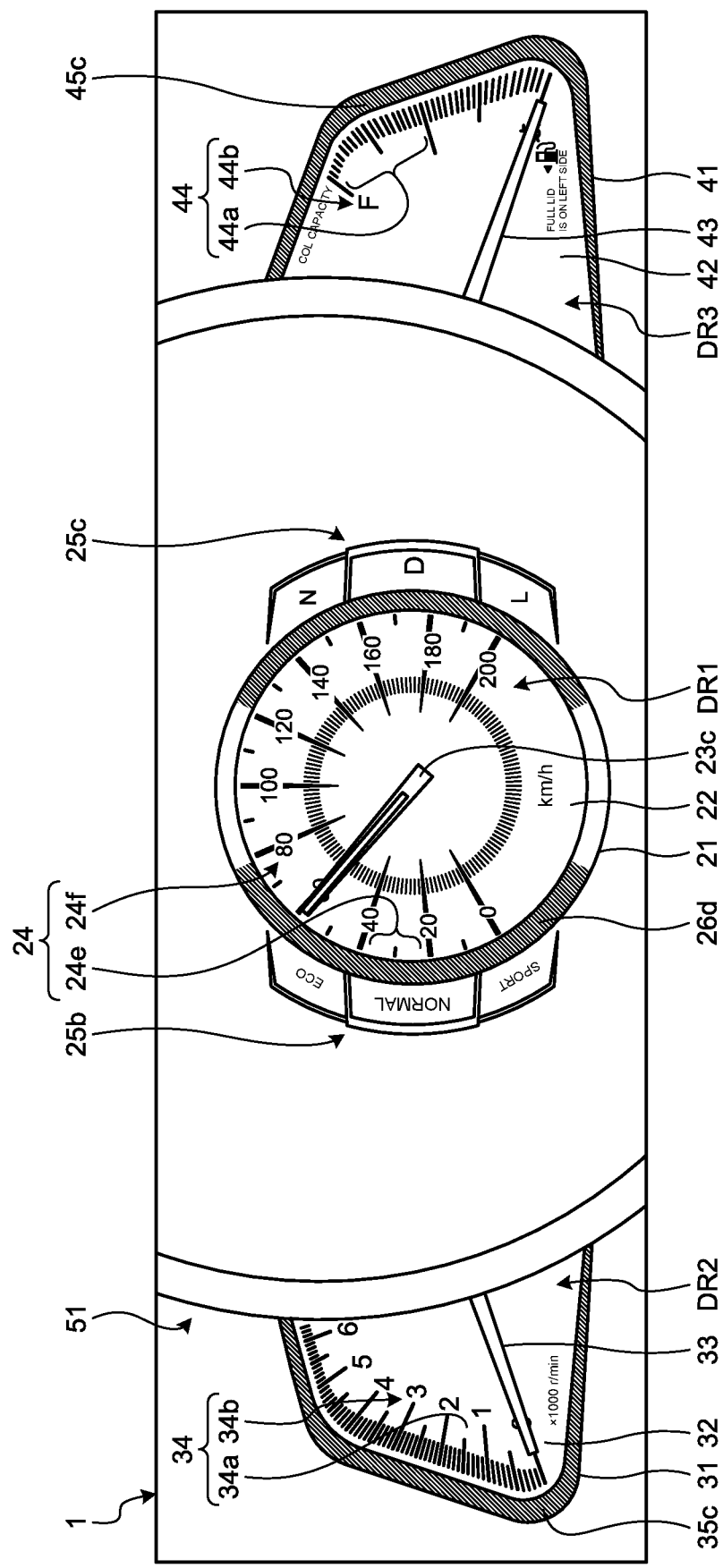
FIG. 11 is another diagram describing the display state depending on the travel mode.

FIG. 11 illustrates a display state in which the normal mode is selected. In FIG. 11, a virtual image is displayed overlapping with an overlapping object in the normal mode. A frame image 26*d* overlapping with the first frame 21, a frame image 35*c* overlapping with the second frame 31, and a frame image 45*c* overlapping with the third frame 41 are displayed in the identical or similar color. The colors of the frame images 26*d*, 35*c*, and 45*c* are set to the color corresponding to the normal mode. The color of the normal mode is, for example, a blue series color or a green series color.

The index image 24 and a first pointer image 23*c* are displayed in the first display region DR1. The index image 24 of FIG. 11 is an index image for the vehicle speed. The index image 24 includes a scale image 24*e* and a character image 24*f* for the vehicle speed. The color of the first pointer image 23*c* is set to the color corresponding to the normal mode.

Figure 12:
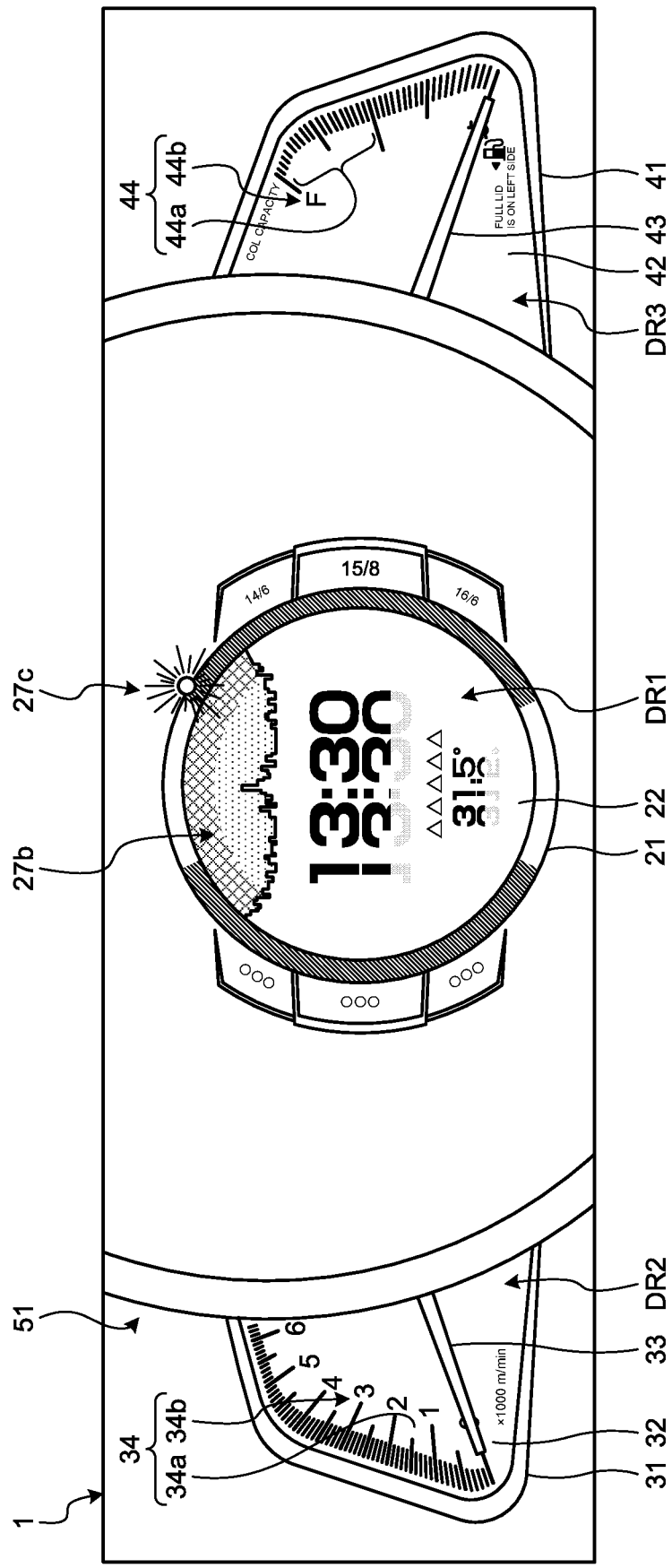
FIG. 12 is a diagram describing a display state depending on a surrounding environment.

An image corresponding to the surrounding environment of the vehicle may be displayed on the display unit 10. FIG. 12 illustrates a display example of a fine weather image. The virtual image display device 6 displays a pattern image 27*b* in the first display region DR1. The pattern image 27*b* is an image showing a landscape of the fine weather. The virtual image display device 6 displays a shine image 27*c* overlapping with the first frame 21. The shine image 27*c* is an image imitating a state in which the first frame 21 shines with external light such as sunlight. The shine image 27*c* is displayed, for example, in an upper edge of the first frame 21 in the height direction. A part of the shine image 27*c* is displayed outside of the first frame 21 in the radial direction. The virtual image display device 6 may change the position, brightness, or color of the shine image 27*c* depending on a travel direction of the vehicle or the time elapse.

FIG. 13 illustrates a display example of a rainfall image. The virtual image display device 6 displays a pattern image 27*d* in the first display region DR1. The pattern image 27*d* is an image showing a landscape at the time of rain. The pattern image 27*d* expresses a raindrop. The virtual image display device 6 displays a droplet image 27*e* overlapping with the first frame 21 and the first dial plate 22. The droplet image 27*e* is an image imitating a droplet attached to the surface of the first frame 21 and the first dial plate 22. The virtual image display device 6 may display an animation simulating a state in which droplets flow down along the surfaces of the first frame 21 and the first dial plate 22 by changing the positions of the droplet images 27*e*. FIG. 13 illustrates the droplet image 27*e* imitating a droplet dripping down from the first frame 21. The pattern image 27*d* or the droplet image 27*e* is an exemplary virtual image that shows a state which does not directly relate to the vehicle state (such as a travel state or a state of a device mounted on the vehicle).

FIG. 14 illustrates a display example of an image after the rain. The virtual image display device 6 displays a pattern image 27*f* in the first display region DR1. The pattern image 27*f* is an image illustrating a landscape after a rainfall such as a landscape of a sunset. The virtual image display device 6 displays the droplet image 27*e* overlapping with the first frame 21. The droplet image 27*e* has a size smaller than that of the droplet image 27*e* at the time of rain illustrated in FIG. 13. The virtual image display device 6 may reduce the size of the droplet image 27*e* depending on the time elapse. The virtual image display device 6 terminates display of the droplet image 27*e* when a predetermined period of time elapses after the rain stops.

In the display unit 10, a light source 9 corresponding to at least one of the three display units 2, 3, and 4 may be turned off. For example, FIG. 15 illustrates a state in which the light source 9 corresponding to the first display unit 2 is turned off. Since the light source 9 is turned off, the first frame 21 is not easily recognized. The virtual image display device 6 displays a pattern image 27*g* overlapping with the first frame 21 and the first dial plate 22. The pattern image 27*g* may also be, for example, an icon image for selecting a menu.

As illustrated in FIG. 16, a navigation image 28 may be displayed in a region surrounded by the first decorating portion 51. The first frame 21 and the first dial plate 22 are hidden by the navigation image 28 and are not substantially recognized. In FIG. 16, a frame image 35*d* overlapping with the second frame 31 and a frame image 45*d* overlapping with the third frame 41 are displayed in the identical or similar color. In addition, a pointer image 36*c* overlapping with the second pointer 33 and a pointer image 46*c* overlapping with the third pointer 43 are displayed in the identical or similar color. The colors of the frame images 35*d* and 45*d* and the colors of the pointer images 36*c* and 46*c* may be identical or similar to each other. In addition, the color of the basic tone of the navigation image 28, the colors of the frame images 35*d* and 45*d*, and the colors of the pointer images 36*c* and 46*c* may be similar to each other.

As described above, the vehicle display device 1 according to this embodiment has the display unit 10 including the pointer (such as the first pointer images 23*a*, 23*b*, and 23*c*, the second pointer 33, and the third pointer 43), the dial plates 22, 32, and 42, and the frames 21, 31, and 41, and the virtual image display device 6. The dial plates 22, 32, and 42 are backgrounds of the pointers (such as the first pointer images 23*a*, 23*b*, and 23*c*, the second pointer 33, and the third pointer 43). The frames 21, 31, and 41 surround the dial plates 22, 32, and 42. In each of the display units 2, 3, and 4, at least one of the pointers, the dial plates, and the frames is the physical element. For example, in the first display unit 2, the first frame 21 and the first dial plate 22 are physically existing elements. In the second display unit 3, the second frame 31, the second dial plate 32, and the second pointer 33 are physically existing elements. In the third display unit 4, the third frame 41, the third dial plate 42, and the third pointer 43 are physically existing elements.

The virtual image display device 6 displays a virtual image overlapping with the physical element of the display unit 10. The virtual image display device 6 according to this embodiment changes at least one of the color and design of the virtual image displayed overlapping with the physical element. In the vehicle display device 1 according to this embodiment, the color or design of the physical element changes variously by the color or design of the virtual image overlappingly displayed in addition to the original color or design of the physical element. Therefore, the vehicle display device 1 according to this embodiment can have the improved designability.

The vehicle display device 1 according to this embodiment does not necessarily have a complicated structure in the frame 21, 31, or 41. For example, in the vehicle display device discussed in Japanese Patent Application Laid-open No. 2008-32516, the light emitting unit or the LED that expresses the scale is provided in an annular member. In the vehicle display device 1 according to this embodiment, the scale can be expressed using a virtual image as illustrated in FIG. 10 and the like. Therefore, such a complicated structure is not necessary.

Note that the "background of the pointer" includes a thing that appears as it exists behind the first pointer images 23*a*, 23*b*, and 23*c*, in other words, a virtual background or a substantial background, as well as those physically positioned behind the pointer. In addition, when both the pointer and the dial plate are displayed as virtual images, the dial plate as the "background of the pointer" also includes a case where the image is generated such that the dial plate is positioned behind the pointer.

The frame "surrounding the dial plate" includes a case where the frame surrounds the display region functioning as the dial plate as well as a case where the frame surrounds the edges of the dial plate. In the example of the second dial plate 32, the second dial plate 32 may be a part of the panel-like member, the part corresponding to the second display region DR2 where information is displayed. In this case, it can be said that the second frame 31 surrounding the second display region DR2 substantially surrounds the second dial plate 32.

In the display unit 10 according to this embodiment, elements other than the physical elements, among the pointers, the dial plates, and the frames, are virtual images displayed by the virtual image display device 6. For example, in the first display unit 2, the first pointer images 23*a*, 23*b*, and 23*c* are elements other than the physical elements, in other words, virtual elements that do not physically exist but can be recognized. The first pointer images 23*a*, 23*b*, and 23*c* are virtual images displayed by the virtual image display device 6. Therefore, the first pointer images 23*a*, 23*b*, and 23*c* can be displayed in any place with any color or shape. Therefore, designability of the vehicle display device 1 is improved. In addition, the first pointer images 23*a*, 23*b*, and 23*c* are displayed when necessary, but are not displayed when unnecessary. Therefore, in the first display region DR1, the pointer can be set to a non-displayed state regardless of turning on/off the light source 9.

The display unit 10 according to this embodiment has at least the dial plate or the frame as the physical element. The virtual image display device 6 displays a virtual image of the scale indicated by the pointer overlapping with this physical element. As illustrated in FIG. 7 or the like, the virtual image display device 6 displays the scale images 24*a*, 24*c*, and 24*e* overlapping with the first dial plate 22. In addition, the virtual image display device 6 displays the scale images 34*a* and 34*c* overlapping with the second dial plate 32 and displays the scale image 44*a* overlapping with the third dial plate 42. The virtual image display device 6 may display the scale image overlapping with the frame 21, 31, or 41. By displaying the scale using the virtual image, it is possible to freely change a layout or color of the scale. Therefore, it is possible to improve designability using the vehicle display device 1 according to this embodiment.

In the virtual image display device 6 according to this embodiment, scales of different indexes are selectively displayed. For example, the scale image 24*a* or 24*e* for the vehicle speed or the scale image 24*c* for the engine rotation speed is selectively displayed in the first display region DR1. Therefore, a plurality of display modes having different indexes are implemented in a single dial plate (first dial plate 22).

The vehicle display device 1 according to this embodiment has the light source 9 that irradiates the frames 21, 31, and 41 as the physical elements. By combining the light of the light source 9 and the virtual image displayed by the virtual image display device 6, designability of the vehicle display device 1 is further improved. For example, as the frames 21, 31, and 41 are irradiated with the light of the light source 9, stereoscopic vision is improved in the frames 21, 31, and 41. Presentation of the stereoscopic vision using the light of the light source 9 and presentation of the color and design using the virtual image display device 6 improve designability of the vehicle display device 1.

Modification of Embodiment

Modifications of the embodiments will be described. The shapes of the frames 21, 31, and 41 are not limited to those described above. For example, the shape of the first frame 21 may have a partially notched annular shape such as a C-shape or U-shape.

The first display unit 2 may be provided with a pointer as the physical element. In the first display unit 2, the first frame 21 or the first dial plate 22 may be a virtual image displayed by the virtual image display device 6. In the second and third display units 3 and 4, any one of the frames 31 and 41, the dial plates 32 and 42, and the pointers 33 and 43 may be a virtual image displayed by the virtual image display device 6. For example, in the second display unit 3, the second dial plate 32 and the second pointer 33 may be virtual images displayed by the virtual image display device 6.

The color of the virtual image displayed overlapping with the overlapping object may change depending on the engine rotation speed. For example, when the engine rotation speed is high, a red virtual image may be displayed overlapping with the frame or pointer. The color of the virtual image may change in response to a user's manipulation. For example, the colors of the frames 21, 31, and 41 may be determined on the basis of a user's command.

The first frame 21 and the first dial plate 22 may not be movable. That is, the first frame 21 and the first dial plate 22 may be fixed to one position.

Those described in the embodiments and modifications may be combined as appropriate.

According to the embodiment, there is provided a vehicle display device including: a display unit having a pointer, a dial plate as a background of the pointer, and a frame surrounding the dial plate, at least one of the pointer, the dial plate, and the frame being a physical element; and a virtual image display device that displays a virtual image overlapping with the physical element, in which the virtual image display device changes at least one of a color and a design of the virtual image displayed overlapping with the physical element. Using the vehicle display device according to the present embodiment, it is possible to improve designability by changing at least one of the color and design of the physical element differently from the original ones.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
    a display unit having a pointer, a dial plate as a background of the pointer, and a frame surrounding the dial plate, at least one of the pointer, the dial plate, and the frame being a physical element;
    a virtual image display device that displays a virtual image, as a whole, overlapping with the physical element, the virtual image having a shape corresponding to a shape of the physical element and adding at least one of a color and a decorative design to the physical element, wherein
    the virtual image display device changes at least one of the color and the decorative design of the virtual image having the shape corresponding to the shape of the physical element, such that an overlap and shape correspondence between the virtual image and the physical element are maintained.

2. The vehicle display device according to claim 1, wherein
    at least one of the pointer, the dial plate, and the frame, other than the physical element, is the virtual image displayed by the virtual image display device.

3. The vehicle display device according to claim 1, wherein
    the display unit has at least one of the dial plate and the frame as the physical element, and
    the virtual image display device displays a virtual image of a scale overlapping with the physical element, the scale being indicated by the pointer.

4. The vehicle display device according to claim 3, wherein
    the virtual image display device selectively displays the scale as scales of different indexes.

5. The vehicle display device according to claim 1, further comprising:
    a light source, wherein
    the frame is the physical element, and
    the light source irradiates the frame while the virtual image overlaps with the frame.

6. The vehicle display device according to claim 2, further comprising:
    a light source, wherein
    the frame is the physical element, and
    the light source irradiates the frame while the virtual image overlaps with the frame.

7. The vehicle display device according to claim 3, further comprising:
    a light source, wherein
    the frame is the physical element, and
    the light source irradiates the frame while the virtual image overlaps with the frame.

8. The vehicle display device according to claim 4, further comprising:
    a light source, wherein
    the frame is the physical element, and
    the light source irradiates the frame while the virtual image overlaps with the frame.

9. The vehicle display device according to claim 1, wherein
    both of the pointer and the frame are the physical element, and
    the virtual image includes a pointer image overlapping with the pointer and having a shape corresponding to a shape of the pointer, and a frame image overlapping with the frame and having a shape corresponding to a shape of the frame.

10. The vehicle display device according to claim 9, wherein
    a color of the pointer image and a color of the frame image are identical or similar.

11. The vehicle display device according to claim 1, wherein the virtual image display device sets the color of the virtual image overlapping with the physical element to a color corresponding to travel mode.

12. A vehicle display device comprising:
    a display unit having a pointer, a dial plate as a background of the pointer, and a frame surrounding the dial plate, at least one of the pointer, the dial plate, and the frame being a physical element;
    a virtual image display device that displays a first virtual image, as a whole, overlapping with the physical element, the first virtual image having a shape corresponding to a shape of the physical element and adding at least one of a color and a decorative design to the physical element, and the virtual image display device displays a second virtual image that partially overlaps with the physical element in a case where the first virtual image is not displayed; and
    a light source that irradiates an entirety of the physical element when the physical element, as the whole, is overlapped by the first virtual image, and does not irradiate the physical element when the physical element is partially overlapped by the second virtual image, in the case where the first virtual image is not displayed, wherein
    the virtual image display device changes at least one of the color and the decorative design of the first virtual image having the shape corresponding to the shape of the physical element, such that an overlap and shape correspondence between the first virtual image and the physical element are maintained.

13. The vehicle display device according to claim 12, wherein
    at least one of the pointer, the dial plate, and the frame, other than the physical element, is a third virtual image displayed by the virtual image display device.

* * * * *